(12) United States Patent  (10) Patent No.: US 8,700,064 B2
Shao et al.  (45) Date of Patent: *Apr. 15, 2014

(54) METHOD AND SYSTEM FOR DEVICE DISCOVERY IN A WIRELESS VIDEO AREA NETWORK

(75) Inventors: Huai-Rong Shao, San Jose, CA (US); Harkirat Singh, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,425

(22) Filed: Jun. 18, 2012

(65) Prior Publication Data

US 2012/0263069 A1  Oct. 18, 2012

Related U.S. Application Data

(63) Continuation of application No. 11/801,601, filed on May 10, 2007, now Pat. No. 8,265,657.

(60) Provisional application No. 60/801,766, filed on May 18, 2006.

(51) Int. Cl.
  *H04W 4/00*  (2009.01)
(52) U.S. Cl.
  USPC .................. 455/456.2; 455/404.2; 455/456.1; 455/457
(58) Field of Classification Search
  USPC .................. 455/456.2, 404.2, 456.1–457
  See application file for complete search history.

(56) References Cited

U.S. PATENT DOCUMENTS

| 4,644,532 A | 2/1987 | George et al. |
| 5,644,576 A | 7/1997 | Bauchot et al. |
| 6,055,429 A | 4/2000 | Lynch |
| 6,307,843 B1 | 10/2001 | Okanoue |
| 7,233,812 B2 | 6/2007 | Okawa et al. |

(Continued)

OTHER PUBLICATIONS

Shih et al. (Distributed Direction based Localization in Wireless sensor networks); 10th IEEE sympposium (ISCC 2005—IEEE).*

(Continued)

*Primary Examiner* — Manpreet Matharu
(74) *Attorney, Agent, or Firm* — Kenneth L. Sherman, Esq.; Michael Zarrabian, Esq.; Sherman & Zarrabian LLP

(57) ABSTRACT

A method and system for device discovery in a wireless network is provided. The device discovery involves directionally transmitting a data unit from a transmitting station over a channel in different directions to emulate omni-directional transmission, receiving the data unit transmissions from different directions at a receiving station, determining the quality of the transmissions received from the different directions, and detecting location information for the transmitting station relative to the receiving station based on the highest quality transmission among the transmissions received from the different directions. Further, if a channel has sufficient bandwidth to satisfy direct link communication between two stations, then during a direct link set-up stage, the two stations conduct a probing message exchange using omni-direction transmission, and upon successful probing, obtain communication link status information and set proper communication configurations for the two stations based on the communication link status information.

22 Claims, 9 Drawing Sheets

(56) References Cited

U.S. PATENT DOCUMENTS

| | | |
|---|---|---|
| 7,248,570 B2 | 7/2007 | Bahl et al. |
| 7,366,464 B2 | 4/2008 | Iacono et al. |
| 7,376,428 B2 | 5/2008 | Hottinen |
| 7,385,960 B2 | 6/2008 | Bansal et al. |
| 7,397,785 B2 | 7/2008 | Wu et al. |
| 7,545,771 B2 | 6/2009 | Wentink et al. |
| 7,664,054 B2 | 2/2010 | Adya et al. |
| 7,720,036 B2 | 5/2010 | Sadri et al. |
| 7,904,723 B2 | 3/2011 | Shin et al. |
| 2004/0072579 A1* | 4/2004 | Hottinen .................... 455/456.1 |
| 2004/0185783 A1* | 9/2004 | Okawa et al. ................ 455/63.4 |
| 2005/0136845 A1* | 6/2005 | Masuoka et al. ........... 455/67.14 |
| 2006/0215628 A1 | 9/2006 | Olariu et al. |
| 2008/0095072 A1 | 4/2008 | Shao et al. |
| 2009/0073942 A1 | 3/2009 | Qin et al. |
| 2011/0110265 A1 | 5/2011 | Shao et al. |

OTHER PUBLICATIONS

Yallapragada et al. (New Enhancements in 3G Technologies); IEEE—2005 p. 182-187.*

NE ASIA Online, "NEC Develops Compact Millimeter-Wave Transceiver for Uncompressed HDTV Signal Transmission," Nikkei Business Publications Asia Ltd, Apr. 5, 2005, pp. 1-2, Japan, downloaded from http://neasia.nikkeibp.com/topstory/000913 on Sep. 29, 2006.

Bahl, P. et al., "RADAR: An In-Building RF-based User Location and Tracking System," 19th Annual Joint Conference of the IEEE Computer and Communications Societies Proceedings, Mar. 26-30, 2000, pp. 775-784, vol. 2, IEEE,United States.

Caetano, L., "SiBEAM—60 GHz Architecture for Wireless Video Display," SiBEAM, Inc., White Paper, Mar. 2006, pp. 1-6, United States.

Cover, T.M. et al., "Capacity Theorems for the Relay Channel," IEEE Trans. Info. Theory, vol. 25, No. 5, Sep. 1979, pp. 572-584, IEEE, United States.

Dabek, F. et al., "Vivaldi: A Decentralized Network Coordinate System," SIGCOMM '04, Aug. 2004, pp. 1-12, ACM, Portland, United States.

ECMA International, "ECMA-387 Standard: High Rate 60 GHz PHY, MAC and HDMI PAL," 1st Edition, Dec. 2008, pp. 1-344, Switzerland.

Freshnews.Com, "SiBEAM Receives Equity Investment from Best Buy," http://freshnews.com/print/node/261440, Jan. 4, 2010, pp. 1-2, United States.

Hachman, M., "CE Giants Back Amimon's Wireless HDTV Tech," www.pcmag.com, Jul. 23, 2008, p. 1, United States.

Hitachi, LTD. et al., "High-Definition Multimedia Interface Specification Version 1.2," HDMI Licensing, LLC, Aug. 22, 2005, pp. 1-214, United States.

IEEE Computer Society, "IEEE Std 802.15.3-2003 IEEE Standard for Information Technology—Telecommunications and Information Exchange Between Systems-Local and Metropolitan Area Networks-Specific Requirements, Part 15.3: Wireless MAC and PHY Specifications for High Rate WPANs," Sep. 29, 2003, pp. 1-324, IEEE, New York, United States.

Jose, B. et al., "MAC Layer Issues and Challenges of Using Smart Antennas with 802.11," IEEE 58th VTC-Fall, vol. 5, Oct. 6-9, 2003, pp. 3169-3173, United States.

Kardos, S.Z. et al., "Performance of a New Device Discovery and Link Establishment Protocol for Bluetooth," IEEE Global Telecommunications Conference, vol. 6, Nov. 28-Dec. 2, 2005, pp. 3518-3522, IEEE, United States.

LG Electronics, Inc., "WirelessHD Specification Version 1.0 Overview," LG Electronics, Inc., Oct. 9, 2007, pp. 1-77, United States.

MBOA, "Distributed Medium Access Control (MAC) for Wireless Networks," Draft 0.99, WiMedia Alliance, Nov. 1, 2005, pp. 1-182, United States.

Nosratinia, A. et al., "Cooperative Communication in Wireless Networks," Adaptive Antennas and MIMO Systems for Wireless Communications, IEEE Communications Magazine, Oct. 2004, pp. 74-80, vol. 42, No. 10, IEEE, United States.

Ostmark, A. et al., "Service and Device Discovery Discovery of Nodes in a Wireless Sensor Network," 2006 3rd IEEE Consumer Communications and Networking Conference, IEEE Computer Society, Oct. 2006, pp. 218-222, vol. 1, No. 8-10, IEEE, United States.

Petrioli, C. et al., "Degree-Constrained Multihop Scatternet Formation for Bluetooth Networks," Global Telecommunications Conference, Nov. 17-21, 2002, pp. 222-226, vol. 1, IEEE, United States.

Qin, X. et al., "Cooperative Automatic Device Discovery for Wireless Networks with Directional Antennas," Samsung Electronics, Sep. 2007, pp. 1-5, United States.

Shih, K. et al., "Distributed Direction-based Localization in Wireless Sensor Networks," Proceedings of the 10th IEEE Symposium on Computers and Communications (ISCC 2005), 2005, pp. 373-378, IEEE, United States.

Van Veen, B.D. et al., "Beamforming: A Versatile Approach to Spatial Filtering," IEEE ASSP Magazine, Apr. 1988, pp. 4-24, vol. 5, No. 2, IEEE, New York, NY, United States.

Zaruba, G.V. et al., "Simplified Bluetooth Device Discovery—Analysis and Simulation," System Sciences, 37th Annual Hawaii International Conference, Jan. 5-8, 2004, pp. 1-9, IEEE, United States.

Zhang, X. et al., "Evaluation and Accelerating Bluetooth Device Discovery," Radio and Wire Symposium 2006, Jan. 17-19, 2006,pp. 467-470, IEEE, United States.

Niculescu, D. et al., "Ad Hoc Positioning System (APS) using AOA," 22nd Annual Joint Conference of the IEEE Computer and Communications Societies, vol. 3, Mar. 30-Apr. 3, 2003, pp. 1734-1743, IEEE, United States.

U.S. Restriction Requirement for U.S. Appl. No. 11/801,601 mailed on May 3, 2010.

U.S. Non-final Office Action for U.S. Appl. No. 11/801,601 mailed on Aug. 19, 2010.

U.S. Final Office Action for U.S. Appl. No. 11/801,601 mailed on Dec. 10, 2010.

U.S. Notice of Allowance for U.S. Appl. No. 11/801,601 mailed on Mar. 22, 2012.

U.S. Non-Final Office Action for U.S. Appl. No. 12/188,954 mailed on Jun. 24, 2011.

U.S. Final Office Action for U.S. Appl. No. 12/188,954 mailed on Jan. 17, 2012.

U.S. Notice of Allowance for U.S. Appl. No. 12/188,954 mailed on May 10, 2012.

U.S. Non-Final Office Action for U.S. Appl. No. 13/007,308 mailed on Nov. 14, 2011.

U.S. Final Office Action for U.S. Appl. No. 13/007,308 mailed on Feb. 22, 2012.

U.S. Advisory Action for U.S. Appl. No. 13/007,308 mailed on May 10, 2012.

U.S. Non-Final Office Action for U.S. Appl. No. 13/007,308 mailed on Jan. 30, 2014.

* cited by examiner

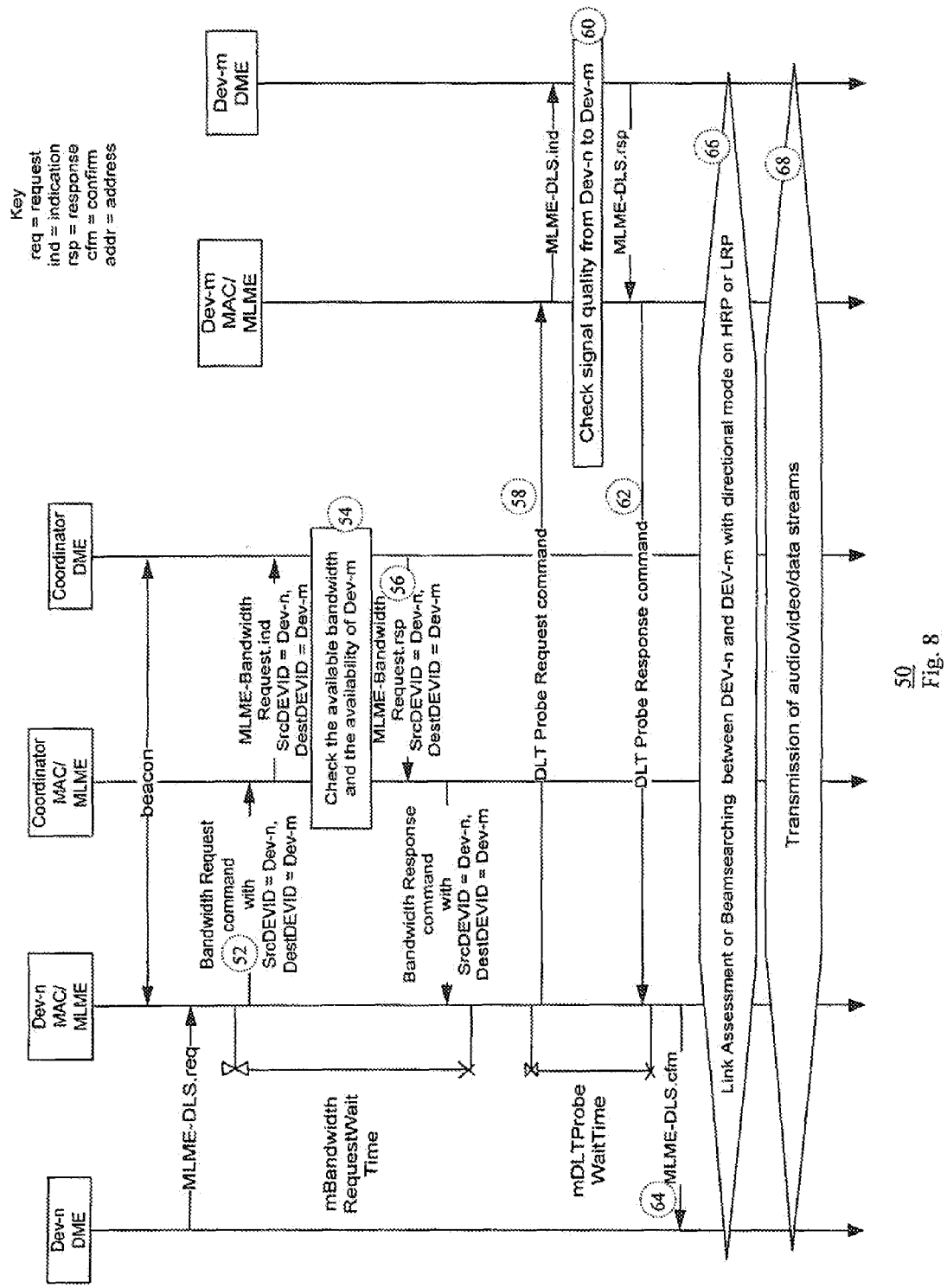

METHOD AND SYSTEM FOR DEVICE DISCOVERY IN A WIRELESS VIDEO AREA NETWORK

RELATED APPLICATION

This application is a Continuation Patent Application of U.S. patent application Ser. No. 11/801,601 filed on May 10, 2007, which application in turn claims the benefit of priority from U.S. Provisional Patent Application Ser. No. 60/801,766, filed on May 18, 2006, both incorporated herein by reference.

FIELD OF THE INVENTION

The present invention relates to device discovery in networks, and in particular to device discovery for a wireless video area network (WVAN).

BACKGROUND OF THE INVENTION

With the proliferation of high quality video, an increasing number of electronics devices (e.g., consumer electronics devices) utilize high definition (HD) video which can require multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals.

The OSI standard provides a seven-layered hierarchy between an end user and a physical device through which different systems can communicate. Each layer is responsible for different tasks, and the OSI standard specifies the interaction between layers, as well as between devices complying with the standard. The OSI standard includes a physical layer, a data link layer, a network layer, a transport layer, a session layer, a presentation layer and an application layer. The IEEE 802 standard provides a three-layered architecture for local networks that approximate the physical layer and the data link layer of the OSI standard. The three-layered architecture in the IEEE 802 standard 200 includes a physical (PHY) layer, a media access control (MAC) layer, and a logical link control (LLC) layer. The PHY layer operates as that in the OSI standard. The MAC and LLC layers share the functions of the data link layer in the OSI standard. The LLC layer places data into frames that can be communicated at the PHY layer, and the MAC layer manages communication over the data link, sending data frames and receiving acknowledgement (ACK) frames. Together the MAC and LLC layers are responsible for error checking as well as retransmission of frames that are not received and acknowledged.

Wireless personal area networks (WPANs) as defined by the IEEE 802 standard and similar technologies can suffer interference issues when several devices are connected which do not have enough bandwidth to carry the uncompressed HD signal, and do not provide an air interface to transmit uncompressed video over a 60 GHz band. The IEEE 802.15.3 specifies channel access methods for transmission of audio/visual information over WPANs. However, in IEEE 802.15.3, channel access control is complicated and is only for access to a single channel. It does not allow efficient device discovery in a wireless network, nor establishing direct communication link based on device discovery.

BRIEF SUMMARY OF THE INVENTION

The present invention provides a method and system for device discovery in a wireless network. In one embodiment, device discovery involves directionally transmitting a data unit from a transmitting station over a channel in different directions to emulate omni-directional transmission, receiving the data unit transmissions from different directions at a receiving station, determining the quality of the transmissions received from the different directions, and detecting location information for the transmitting station relative to the receiving station, based on the highest quality transmission among the transmissions received from the different directions.

In another embodiment, the present invention provides a direct link wireless data communication process, which includes: receiving a request for wireless communication between two wireless stations over a wireless channel; determining if the channel has sufficient bandwidth to satisfy the communication request; if the channel has sufficient bandwidth to satisfy the communication request, establishing a direct communication link between the two stations over the channel. The step of establishing the direct communication link, including the steps of: during a direct link set-up stage, the two stations conduct a probing message exchange using omni-direction transmission; and upon successful probing, obtaining communication link status information and setting proper communication configurations for the two stations based on the communication link status information.

These and other features, aspects and advantages of the present invention will become understood with reference to the following description, appended claims and accompanying figures.

BRIEF DESCRIPTION OF THE DRAWINGS

FIG. 8 shows an example of direct link set-up procedure in a WVAN, according to the present invention.

DETAILED DESCRIPTION OF THE INVENTION

The present invention provides a method and system for device discovery in a wireless video area network (WVAN)

such as a wireless high definition (WiHD) WVAN including wireless devices. For device discovery, the same data is directionally transmitted by a transmitter over a channel in different directions to emulate omni-directional transmission. One or more receivers utilize the quality of the signal received from those different directions to detect the location of the transmitter. The receivers obtain the location information and update their location information by analyzing periodically received beacons. The location information can be used for direct link support and reduction of the PHY preamble length in the PHY header and the PHY payload size.

Figure 1:
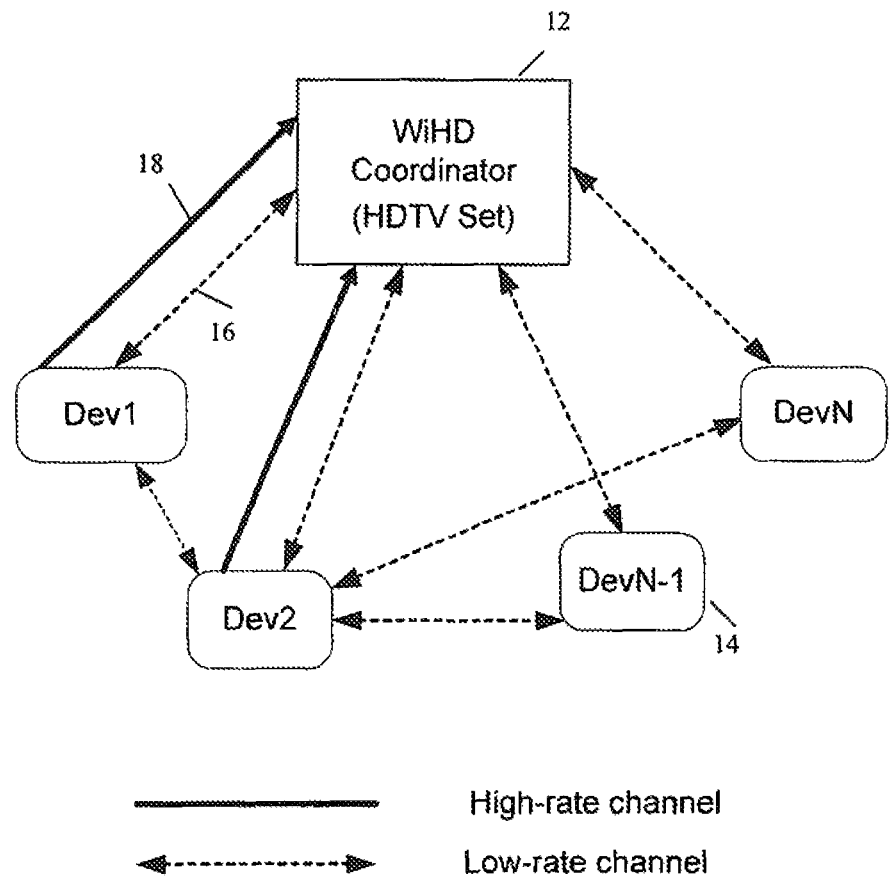
FIG. 1 shows a functional block diagram of a wireless network that implements uncompressed HD video transmission between wireless stations, according to an embodiment of the present invention.

FIG. 1 shows a functional block diagram of a wireless network 10 that includes wireless communication stations 12 and 14 implementing uncompressed HD video communication, according to an embodiment of the present invention. The wireless communication stations 12 comprise a coordinator 12 such as a WiHD coordinator. The wireless communication devices 14 include devices 4 (e.g., Dev-1, . . . , Dev-n). The coordinator 12 and the devices 14 utilize a low-rate (LR) channel 16 (shown by dashed lines in FIG. 1) and a high-rate (HR) channel 18 (shown by heavy solid lines in FIG. 1) for communication therebetween.

In this embodiment, the coordinator 12 is a sink of video and/or audio data implemented, for example, in a HDTV set in a home wireless network environment which is a type of WLAN. Each device 14 comprises a device that can be the source of uncompressed video or audio. Examples of each device 14 can be a set-top box, a DVD player, etc. A device 14 can also be an audio sink. In another example, the coordinator 12 can be a source of a video stream. In yet another example, the coordinator provides channel coordination functions for wireless communication between a sink station and a source station. The coordinator functions such as channel access functions, according to the present invention can also be implemented in a stand-alone device, in a sink device and/or in a source device. A device can be the source of uncompressed video or audio like set-top box or DVD player. A device can also be an audio sink.

In order to establish a WVAN for communication, available channel frequencies are scanned to determine available channels (i.e., not in use by neighboring networks). All LR channels are scanned to find channels with minimal interference with other networks. Then, the frequency band of the HR channels is scanned for interference, and a channel with minimal interference is selected.

A total of j channels in the frequency range of 57-66 GHz are defined by a High-Rate Plan (HRP) for the HR frequency. Due to regulatory restrictions, not all of these channels are available in all geographic regions. For example, when j=4, four channels are indexed by a HRP channel index. These HRP frequency channels are defined by example in Table 1 below.

TABLE 1

HRP frequency plan

| HRP channel index | Start frequency (GHz) | Center frequency (GHz) | Stop frequency (GHz) |
|---|---|---|---|
| 1 | 57.2 | 58.2 | 59.2 |
| 2 | 59.4 | 60.4 | 61.4 |
| 3 | 61.6 | 62.6 | 63.6 |
| 4 | 63.8 | 64.8 | 65.8 |

Each HRP channel has a start frequency, a center frequency and a stop frequency. The start and stop frequencies define a HRP frequency channel.

A Low-Rate-PHY frequency Plan for the LRP uses the same frequency bands as the HRP, wherein within each of the HRP channels, a number k of LRP channels are defined. In this example, for k=3, three LR channels are defined for each of the four HRP bands. Only one LRP channel is used by a WVAN at a time. This allows multiple WVANs to use the same HRP frequency channel in close proximity, while minimizing channel interference. Each LRP channel is defined relative to the center frequency of the corresponding HRP channel, fc(HRP). As such, within each of the HRP channels, three LRP channels are defined near the center frequency of the HRP channel. The LRP frequency channels, indexed by a LRP channel index, are defined by example in Table 2 below.

TABLE 2

LRP frequency plan

| LRP channel index | Start frequency (GHz) | Center frequency (GHz) | Stop frequency (GHz) |
|---|---|---|---|
| 1 | fc(HRP) − 240 MHz | fc(HRP) − 200 MHz | fc(HRP) − 160 MHz |
| 2 | fc(HRP) − 40 MHz | fc(HRP) | fc(HRP) + 40 MHz |
| 3 | fc(HRP) + 160 MHz | fc(HRP) + 200 MHz | fc(HRP) + 240 MHz |

Each LRP channel has a start frequency, a center frequency and a stop frequency. The start and stop frequencies define a LRP frequency channel. In this example, each LRP frequency band is an 80 MHz band, the LRP channels are separated by 120 MHz bands, and the center frequencies of the LRP channels are separated by 200 MHz bands.

The LRP channel implements orthogonal frequency division multiplexing (OFDM) and offers both omni-directional and beam-steered (i.e., directional) modes. Directional transmission in different directions according to the present invention comprises beam steered transmission in different directions. The transmission data rates for the LRP range from 2.5 Mb/s to 10 Mb/s for the omni-directional mode and 20 Mb/s to 40 Mb/s for the beam-steered mode. Channel coding includes ⅓, ½ and ⅔ convolutional coding. For the omni-directional mode, coding includes 4-times (i.e., 4×) or 8-times (i.e., 8×) replication coding, while for the beam-steered mode there is no replication. A summary of the LRP modes is provided by example in Table 3 below in indexed form.

TABLE 3

Summary of LRP modes

| LRP mode index | Modulation | FEC | PHY data rate (Mb/s) omni | PHY data rate (Mb/s) beam formed | Replication omni | Replication beam formed |
|---|---|---|---|---|---|---|
| 0 | BPSK | ⅓ | 2.512 | 20.096 | 8x | 1x |
| 1 | | ½ | 3.768 | 30.144 | 8x | 1x |
| 2 | | ⅔ | 5.024 (also supported in directional mode) | 40.192 | 8x | 1x |
| 3 | | ⅔ | 10.048 | — | 4x | — |

The LRP modes are utilized in a device discovery process which involves a station location map set-up procedure, a location information update procedure and a location and distance information query procedure, as described below. The device location information can then be utilized for direct link transmission, frame preamble and payload size reduction for unicast transmissions, and LRP preamble and payload size reduction for multicast transmissions, as described further below.

Figure 2:
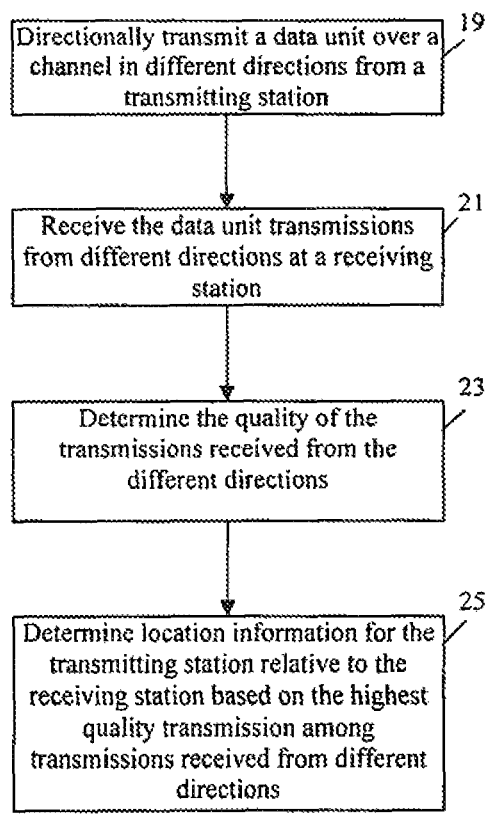
FIG. 2 shows an example device discovery process, according to the present invention.

FIG. 2 shows an example process 17 for device discovery according to the present invention, including the steps of: directionally transmitting a data unit over a channel in different directions from a transmitting station in the network to emulate omni-directional transmission (step 19); receiving the data unit transmissions from the different directions at a receiving station in the network (step 21); determining the quality and parameters of the transmissions received from the different directions (step 23); and determining location information for the transmitting station relative to the receiving station based on the highest quality received transmission among the received transmissions received from the different directions (step 25). The above steps are described in more detail below.

Device Discovery

Location Map Set-Up

In omni-directional emulation mode, the same information is retransmitted (repeated) in N different directions on the LRP channel by beamforming to emulate omni-directional transmission, according to the present invention.

Figure 3:
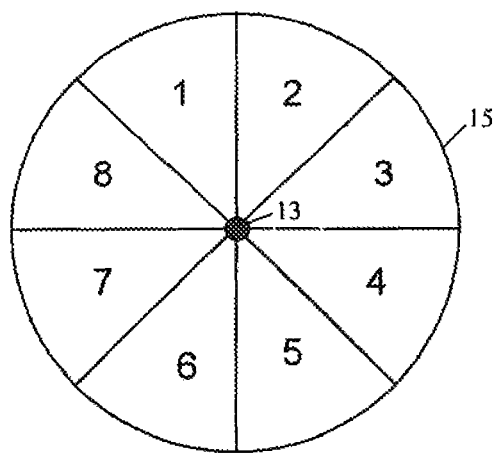
FIG. 3 shows an example of different direction sections for emulating omni-directional transmission, according to the present invention.

During an association stage wherein the stations are associated for communication, MAC frames are exchanged in omni-directional emulation mode between stations. For example, as shown in FIG. 3, in the LRP modes 1 through 3, a data unit (e.g., a frame or packet) is transmitted from a transmitting station at a location 13 to N=8 different directions 15 (e.g., direction sections 1, 2, . . . , 8, each covering a 45 degree angle) to emulate omni-directional transmission. When a frame is received, a receiving station can measure and compare the signal quality (and other parameters) of the received frame, with that of other copies of the frame received from the transmitting station in other directions. Then, based on such measurement and comparison, the receiving station determines the direction of the transmitting station relative to the receiving station, as location information. The direction of the transmitting station is one of the sections 15 in FIG. 3 (or section boundary) along which the highest quality transmission of the frame from the transmitting station was measured. The receiving station maintains the location information for each associated station. Further, each associated station also maintains location information for itself and other stations identified in broadcast beacons.

For example, in an association the coordinator 12 is associated with a device 14 for communication, wherein MAC frames are exchanged in omni-directional emulation mode between the coordinator 12 and the device 14. When a frame is received, the coordinator 12 or the device 14 can measure and compare the signal quality (and other parameters) of the frame, with that of other copies of the frame from other directions. Then, based on such measurement and comparison, the coordinator 12 or device 14 determines the direction of the device 14 relative to the coordinator 12, as location information. The direction of the device 14 is along a section in FIG. 3 (or section boundary) along which the highest receive signal level was measured. The coordinator 12 maintains the location information for each associated device in a device list. Further, each associated device 14 also maintains the location information for itself and other devices 14 identified in broadcast beacons.

The term "location" as used herein is an abstract concept related to geographic location, but not exactly equal to geographic location. Usually geographically proximate stations are close to each other in location, however, there can be exceptions due to environmental and channel conditions. The location information can be represented as a location map comprising a location vector. For N directional retransmissions (i.e., N× or N repetitions) of a data unit in a LRP mode along N corresponding directions, the location vector includes N elements. Each element describes the signal quality or other parameters of the data transmission for one of the N directions.

Location Information Update

In one implementation, the coordinator 12 periodically transmits a data unit comprising a beacon frame in omni-directional emulation mode, wherein N copies of the beacon frame are directionally transmitted in N different directions, as described. When receiving a beacon frame from the coordinator 12, a receiving device 14 measures and compares the signal quality (and other parameters) for copies of the beacon frame received from the coordinator 12 in different directions. The receiving device 14 utilizes comparison of such signal quality and parameters to determine a new location vector for the coordinator 12. Then a "distance" between the new location vector and the existing location vector (e.g., in a device list) is determined. The term "distance" as used herein is an abstract concept, related to geographic distance but not exactly equal to geographic distance.

If the distance is larger than a pre-defined threshold, then the device 14 attempts to send a location updating control frame to the coordinator 12 within an un-reserved channel time block (FIGS. 5A-B, described further below). An optional acknowledgement (ACK) can be sent back from the coordinator 12 to announce the successful reception of the location updating control frame. The coordinator 12 updates the location information for the device 12 stored in its device list. Optionally, the coordinator 12 announces the new (updated) location information for the device 14 in a next beacon transmission from the coordinator 12.

Location and Distance Information Query

For direct link transmission between the devices 14, a first device 14 may require location information for one or more other devices in the network and also the corresponding distance information. The coordinator 12 maintains the location information for the devices 14 relative to the coordinator 12. The first device 14 sends a location query request control frame for location information of one or more devices 14 to the coordinator 12 (e.g., transmitted within an un-reserved channel time block). An optional ACK can be sent back from the coordinator 12 to announce the successful reception of the location query request control frame. The coordinator 12 then responds to the device 14 with a location query response command frame which provides location information including distance information for one or more devices in the network. The first device then determines location information of a second device relative to the first device using the location information of the first device relative to the coordinator and the location information of the second device relative to the coordinator.

Figure 4:
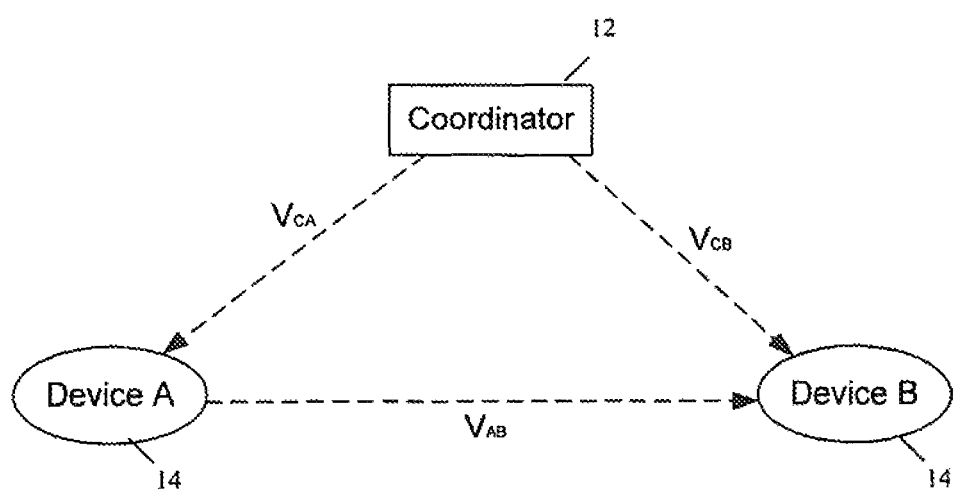
FIG. 4 shows an example of location detection process, according to the present invention.

An example in FIG. 4 shows a device 14 designated as Device A, another device 14 designated as Device B and the coordinator 12. Device A knows its location vector $V_{CA}$ in relation to the coordinator 12, and Device B knows its location vector $V_{CB}$ in relation to the coordinator 12. Device A requires location information for Device B. Device A obtains the location information of Device B (i.e., $V_{CB}$), from the coordinator 12 by location query signaling, as described. Then, Device A estimates the distance information from Device A to Device B as $V_{AB}=V_{CA}-V_{CB}$, where "−" is a type of vector subtraction operation. Alternatively, the coordinator 12 can calculate $V_{AB}$ directly and send it to Device A directly. Due to influence of environmental and channel conditions, the actual distance from Device A to Device B can be different from $V_{AB}$. However, usually $V_{AB}$ is a good estimate of the actual distance between Device A and Device B.

Device discovery and location detection according to the present invention does not require additional signaling or signaling modules other than the coordinator 12 and devices 14 themselves. Further, using the location and distance information for the devices, the PHY preamble overhead in the PHY headers, and PHY payload size are reduced. Thus, the overall throughput of WiHD network is improved.

Channel Access Control

The coordinator 12 uses a LR channel 16 and a HR channel 18, for communication of video information with the devices 14. Each device 14 uses the LR channel 16 for communications with other devices 14. The HR channel 18 only supports single direction unicast transmission with, e.g., multi-Gb/s bandwidth to support uncompressed HD video transmission. The LR channel 16 can support bi-directional transmission, e.g., with at most 40 Mbps throughput. The LR channel 16 is mainly used to transmit control frames such as acknowledgement (ACK) frames. Some low-rate data such as audio and compressed video can be transmitted on the LR channel between two devices 14 directly.

The HR channel only supports single direction unicast transmission with multi-Gb/s bandwidth to support uncompressed HD video. The LR channel can support bi-directional transmission with at most 40 Mbps throughput. A low-rate channel is mainly used to transmit control frames such as ACK frames. It is also possible some low-rate data like audio and compressed video can be transmitted on the low-rate channel between two devices directly.

Figure 5:
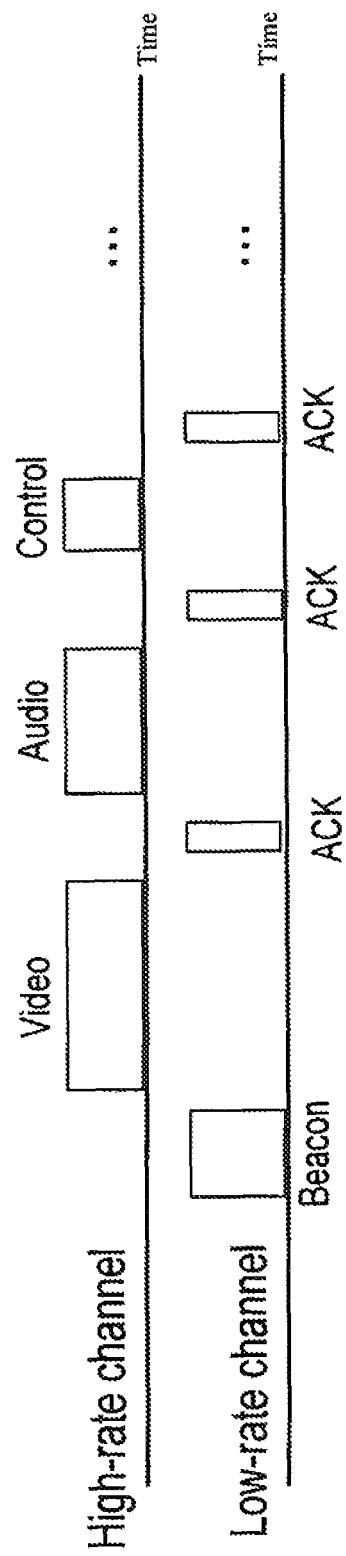
FIG. 5 shows an example timing diagram for Time Division Duplex (TDD) scheduling applied to low-rate and high-rate wireless communication channels in FIG. 1.

As shown by the example timing diagram in FIG. 5, TDD scheduling is applied to the LR and HR channels 16 and 18, whereby at any one time the LR and HR channels 16 and 18, cannot be used in parallel for transmission. In the example of FIG. 6, beacon and ACK packets/frames are transmitted over the LR channel 16 in between transmission of packets of data (e.g., video, audio and control message) information over the HR channel 18. Beamforming technology can be used in both the LR and HR channels. The LR channel can also support omni-direction transmissions. The HR channel and the LR channel are logical channels.

In many wireless communication systems, a frame structure is used for data transmission between wireless stations such as a transmitter and a receiver. For example, the IEEE 802.11 standard uses frame aggregation in a MAC layer and a PHY layer. In a typical transmitter, a MAC layer receives a MAC Service Data Unit (MSDU) and attaches a MAC header thereto, in order to construct a MAC Protocol Data Unit (MPDU). The MAC header includes information such a source addresses (SA) and a destination address (DA). The MPDU is a part of a PHY Service Data Unit (PSDU) and is transferred to a PHY layer in the transmitter to attach a PHY header (including a PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

There are two approaches for a wireless station (STA) to access a shared wireless communication channel. One approach is a contention-free arbitration (CF) method, and the other is a contention based arbitration (CB) method. There are multiple channel access methods for a CF period. For example, a point coordinator function (PCF) can be utilized to control access to the channel. When a PCF is established, the PCF polls registered STAs for communications and provides channel access to the STAs based upon polling results. The CB access method utilizes a random back-off period to provide fairness in accessing the channel. In the CB period, a STA monitors the channel, and if the channel has been silent for a pre-defined period of time, the STA waits a certain period of time, such that if the channel remains silent, the STA transmits on the channel.

The coordinator and the non-coordinator devices share the same bandwidth, wherein the coordinator coordinates the sharing of that bandwidth. Standards have been developed to establish protocols for sharing bandwidth in a wireless personal area network (WPAN) setting. As noted, the IEEE standard 802.15.3 provides a specification for the PHY layer and the MAC layer in such a setting where bandwidth is shared using a form of time division multiple access (TDMA). According to the present invention, the MAC layer defines a superframe structure, described below, through which the sharing of the bandwidth by the non-coordinator devices 14 is managed by the coordinator 12 and/or the non-coordinator devices 14.

Figure 6A:
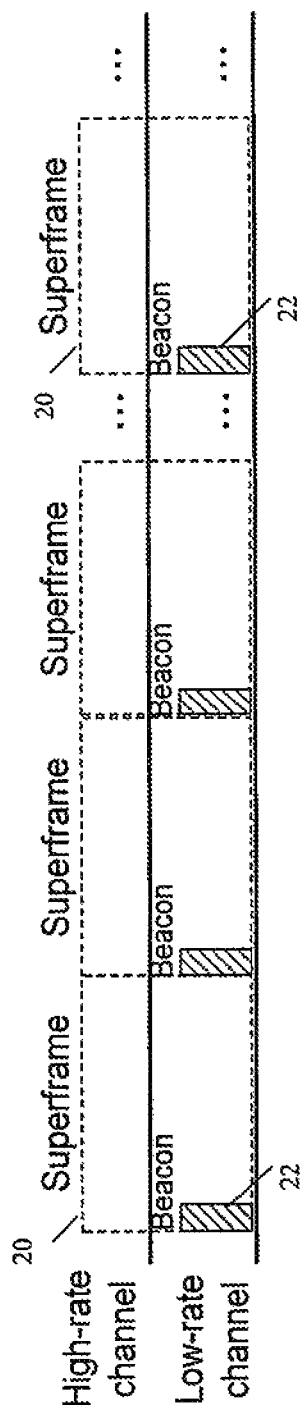
FIG. 6A shows example superframe structures for channel access control, according to the present invention.
Figure 6B:
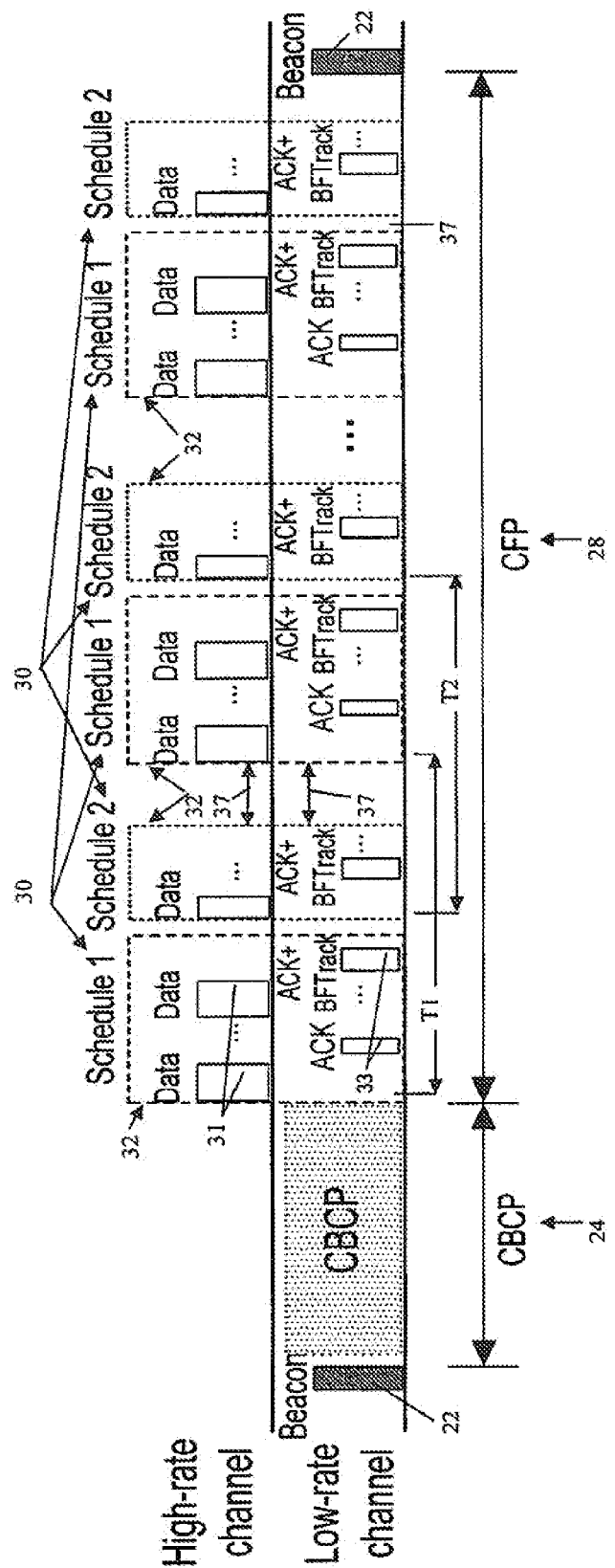
FIG. 6B shows example details of a superframe structure, according to the present invention.

According to the present invention, in a contention-free period, instead of PCF polls, time scheduling is utilized wherein beacons provide information about scheduled channel time blocks for devices. A superframe-based channel access control for transmission of uncompressed video over wireless channels, according to the present invention, is applied based on a superframe structure shown by example in FIGS. 6A-B. FIG. 6A shows a sequence of superframes 20, and FIG. 6B shows the details of a superframe 20 for the LR and HR channels including multiple schedules 30. Each schedule 30 includes one or more periodical reserved channel time blocks (CTBs) 32 which are reserved for transmission of isochronous data streams. Each schedule 30 includes multiple reserved CTBs 32, wherein duration of a schedule is divided between multiple CTBs 32. Each reserved CTB 32 is allocated to a portion of the corresponding schedule, wherein T1 indicates the time period between the start of each Schedule1 interval, and T2 indicates the time period between the start of each Schedule2 interval.

The schedules 30 represent reserved CTBs 32, and the time periods between the schedules 30 are unreserved CTBs. As such, each superframe 20 includes two CTB categories: reserved CTBs 32 and unreserved CTBs 37. Such a superframe 20 is useful for channel access control using CTBs for transmission of uncompressed video over wireless channels (e.g., the HR channel 18 and the LR channel 16). Beacons are used to separate channel time into multiple superframes. In each superframe there are contention periods and contention-free periods. In each CFP there are one or more schedules. A superframe includes a contention-based control period (CBCP), a CFP including multiple reserved channel time blocks (RCTBs) and/or unreserved channel time blocks (UCTBs). Specifically, the superframe 20 includes:

1. A beacon frame ("beacon") 22 which is used to set timing allocations and to communicate management information for the network 10 (e.g., WiHD sub-net). It is assumed that beacon signals are always transmitted omni-directionally.
2. A CBCP 24 is used to communicate Consumer Electronic Commands (CECs) and MAC control and management commands on the LR channel 16. No information can be transmitted on the HR channel 18 within the CBCP period. There can also be a beam-search period (BSP) between the CBCP 24 and the CFP 28 to search transmission beams and to adjust beamforming parameters (e.g., every 1~2 seconds a BSP can appear in the corresponding superframe 20).

3. The CFP 28 which includes said CTBs comprising one or more reserved CTBs 32 and one or more unreserved CTBs 37.

The reserved CTBs 32 are reserved by one or multiple devices 14 for transmission of commands, isochronous streams and asynchronous data connections. The reserved CTBs 32 are used to transmit commands, isochronous streams and asynchronous data connections. Each reserved CTB 32 can be used for transmitting a single data frame or multiple data frames. The schedules 30 organize the reserved CTBs 32. In each superframe 20, a schedule 30 can have one reserved CTB 32 (e.g., for pre-scheduled beam-searching or bandwidth reservation signaling) or multiple periodical reserved CTBs 32 (e.g., for an isochronous stream). Unreserved CTBs 37 are typically used to transmit CECs (and MAC control and management commands on the LR channel. No beamforming transmission is allowed within the unreserved CTBs. Unreserved CTBs 37 can also be used for transmission of control and management packets between devices 14 if direct link support (DLS) is allowed. During an unreserved CTB 37, only the LR channel, operating in an omni-direction mode, can be utilized. No information can be transmitted on the HR channel during an unreserved CTB 37. Different contention-based medium access mechanisms, such as a carrier sense multiple access (CSMA) scheme or a slotted Aloha scheme can be used during an unreserved CTB 37.

A beacon 22 is transmitted periodically to identify the start of every superframe 20. Configuration of the superframe 20 and other parameters are included in the beacon 22. For example, the beacon 22 indicates the start time and length of the periods CBCP 24 and the CFP 28. In addition, the beacon 22 dictates allocation of the CTBs in the CFP 28 to different devices 14 and streams. Since devices can implicitly know the timing information of unreserved CTBs, a beacon frame need not carry timing information for unreserved CTBs.

For reservation-based time allocation, data transmissions using beamforming must be reserved in advance. A device 14 requests send-bandwidth from the coordinator 12 for the transmission of both isochronous streams and asynchronous data. If there is enough bandwidth, the coordinator 12 allocates a schedule for the requesting device. Each schedule includes a series of evenly distributed reserved CTBs 32 having equal durations. A schedule can include multiple reserved CTBs 32, or one reserved CTB 32 in a superframe 20, or one reserved CTB 32 in every N superframes 20. Usually an isochronous stream is transmitted within one schedule for each superframe 20. However, it is also possible to allocate multiple schedules for one isochronous or asynchronous stream. Multiple streams belonging to the same device can also be transmitted within one schedule. Each data packet 31 transmitted from a device to a destination has a corresponding ACK packet 33 sent back from that destination, wherein each data packet 31 and corresponding ACK packet 33 form a data-ACK pair. A CTB 32 can include a single data-ACK pair or multiple data-ACK pairs.

A schedule can be reserved for periodic beam-searching in which one reserved CTB 32 appears every 1~2 seconds. Periodic beam-searching can also be performed within unreserved CTBs. In addition to periodic beam-searching, event-driven beam-searching (i.e., dynamic beam-searching) can be triggered by factors such as bad channel status. If event-driven beam-searching is to be implemented without affecting other reserved schedules, the length of any reserved CTB for a schedule ($T_{reserved\_CTB}$) plus the length of unreserved CTBs immediately after the reserved CTB ($T_{un\_reserved\_CTB}$) should not be less than the length of a beam-searching period $T_{beam-searching}$ (e.g., 400 μs as default). As such, $T_{reserved\_CTB} + T_{un\_reserved\_CTB} \geq T_{beam-searching}$.

Utilization of Device Location Information for Communication Using a Superframe

As noted, the device location information can be utilized for direct link transmission, frame preamble and payload size reduction for unicast transmissions, and LRP preamble and payload size reduction for multicast transmissions, as described below.

Direct Link Transmission

A device 14 in the WVAN can communicate with another device 14 using direct link transmission, according to the present invention. During a direct link set-up stage, the two devices 14 conduct a probing message exchange using a LRP mode omni-direction transmission to ensure that the two devices 14 can receive signals from each other successfully. After a successful probing, indicating that the two devices 14 can receive signals from each other successfully, a link assessment/recommendation or beam-searching/steering process can be conducted to obtain accurate communication link status information, and to set proper transmission/receiving configurations for the two devices.

Figure 7:
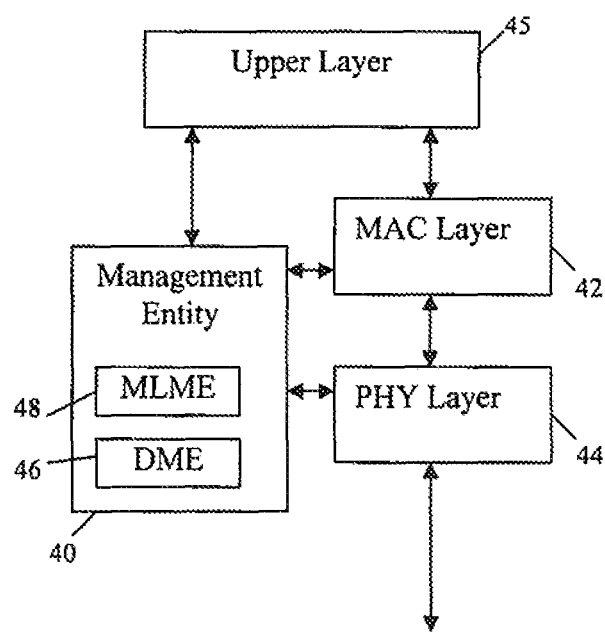
FIG. 7 shows an example of a management entity for direct link transmission in a WVAN, according to the present invention.

FIG. 7 shows an example management entity (ME) 40 for implementing such direct link transmission, wherein the ME 40 includes a MAC layer management entity (MLME) function 48 for managing MAC layer operations and a device management entity (DME) function 46 for establishing a channel and controlling channel access. The DME function 46 and the MLME function 48 can be implemented in the same device or on difference devices. Further, the coordinator 12 and each of the devices 14 can include a ME 40. The ME 40 further provides monitoring and control functions to a MAC layer 42 and a PHY layer 44, and facilitates communication between the upper layers 45 and the MAC layer 42. The MLME messages below are defined by the IEEE 802.15.3 standard ("Wireless Medium Access Control (MAC) and Physical Layer (PHY) Specifications for High Rate Wireless Personal Areas Networks (WPANs)," 2003). The operations of the DME and MLME functions in response to the MLME messages are according to the present invention, as described below by example in relation to FIG. 8.

FIG. 8 shows an example process 50 for direct link communication between two devices 14 such as a device n (Dev-n) and a device m (Dev-m). When the Dev-n desires to set-up a direct link transmission with the Dev-m, in step 52 the Dev-n sends a bandwidth reservation request command (indicating the amount of bandwidth requested) to the coordinator 12 within an unreserved CTB. In step 54 the coordinator 12 checks the available channel bandwidth and also the availability of the Dev-m, and in step 56 the coordinator 12 sends back a bandwidth response command to the Dev-n. Specifically, in step 56 if the available bandwidth is sufficient to satisfy the request, and the Dev-m is available, the coordinator 12 reserves CTBs for the requested bandwidth and responds to the Dev-n with a bandwidth response command that grants the bandwidth reservation request; otherwise, the coordinator 12 responds with a bandwidth response command that rejects the bandwidth reservation request.

After obtaining the reserved bandwidth, during a reserved CTB for direct link transmission, in step 58 the Dev-n probes the Dev-m by sending a direct link transmission (DLT) probe request command frame as a MAC command in omni-directional emulation mode in a LRP, and waits for a DLT probe response from the Dev-m. Upon successful reception of the DLT probe request frame, in step 60 the Dev-m measures and compares the signal quality and other parameters of repetition copies of the DLT probe request frame received in different directions from the Dev-n, and determines the direction of the Dev-n relative to Dev-m. Then, in step 62 the Dev-m sends back a DLT probe response command with channel coefficients information to the Dev-n. If the Dev-n cannot obtain a DLT probe response command after a waiting period (e.g., mDLTProbeWaitTime), the Dev-n may then repeatedly send the DLT probe request command a number of times (e.g., mMaxDLTProbing times).

Upon receiving a DLT probe response command from the Dev-m, a DLT probe request/response exchange may be repeated between the Dev-n and Dev-m up to a threshold (e.g., mMaxDLTProbingNum times). After the probing procedure, if probing of the Dev-m by the Dev-n in omni-directional mode at the LRP is successful, then in step 64, the MAC layer of the Dev-n reports a successful DLT set-up to the DME with a MLME-DLS.cfm primitive message; otherwise, the Dev-n sends a bandwidth request command to the coordinator 12 to release the reserved CTBs and reports a DLT set-up failure to the DME with a MLME-DLS.cfm primitive message in step 64.

Then in step 66, a link assessment/recommendation or beam-searching/steering in directional mode at the HRP or LRP may be conducted to obtain accurate link status information in directional mode and set proper transmission/reception configurations before starting transmission of audio/video or data streams over the channels. Then, in step 68, communication of audio/video/data streams in the reserved CTBs between the Dev-n and Dev-m commences.

LRP Preamble and Payload Size Reduction for Unicast Transmission

A device 14 knows its location relative to the coordinator 12 by receiving beacons periodically transmitted from the coordinator 12. Based on such location information, the device 14 only needs to send a PHY preamble and PHY payload at the directions with good signal quality. Thus the device 14 can reduce the size of the PHY preamble and payload in the MAC frames it transmits to the coordinator 12. Specifically, the device 14 can reduce the size of the PHY preamble and PHY payload from N-times (i.e., N×) to M-times (i.e., M×) wherein N≥M, according to the location vector of device 14 and without requiring accurate beam-searching, provided that all devices 14 are within M direction sections (FIG. 3) of the coordinator 12. Similarly, if the coordinator 12 only wants to transmit a MAC frame to one device 14, the coordinator 12 can reduce the size of the PHY preamble and the payload in the MAC frames it transmits to the device 14 from N× to M× (wherein N≥M) according to the location vector of the coordinator 12, without requiring accurate beam-searching since the coordinator 12 can obtain location updates from the device 14.

LRP Preamble and Payload Size Reduction for Omni-Direction Multicast Transmission When the coordinator 12 is a multicast source in a multicast group, since the coordinator 12 knows the locations of all destination devices 14 in the multicast group, the coordinator 12 can reduce the PHY preamble and payload size in its multicast MAC frames from N× to M× (N≥M), provided that all destination devices 14 are within M direction sections (FIG. 3) of the coordinator 12.

When a device 14 is a multicast source in a multicast group, the device 14 can obtain the locations of all devices in the multicast group using location query exchanges, and then calculate the location vectors of all other devices in relation to the multicast source. Then, the device 14 can reduce the size of the PHY preamble and payload in its multicast MAC frames from N× to M× (N≥M), provided all destination devices are within M direction sections (FIG. 3) of the multicast source device 14.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for device discovery in a wireless network, comprising:
   receiving data unit transmissions from different directions at a receiving station from a transmitting station;
   detecting location information for the transmitting station relative to the receiving station based on a highest quality transmission among the transmissions received from the different directions, wherein the location information comprises a location vector including N elements corresponding to directional transmissions of a data unit in N different directions, wherein each vector element describes the signal quality of the transmission along a corresponding one of the N directions,
   wherein the receiving station measures and compares signal quality for copies of a beacon received in different directions, for determining a new location vector and determines a distance between the new location vector and an existing location vector.

2. The method of claim 1, further comprising:
   coordinator station transmitting the copies of the beacon, wherein N copies of the beacon are directionally transmitted in N different directions.

3. The method of claim 2, wherein the coordinator station periodically transmitting the beacon in omni-directional emulation mode.

4. The method of claim 3, further comprising: if the distance is larger than a pre-defined threshold, then the receiving station transmitting a location updating control frame to the coordinator station; and the coordinator station updating the location information for the receiving station maintained by the coordinator.

5. The method of claim 4 wherein directionally transmitting comprises transmitting a data unit in different directions by beam-steering transmission of the data unit in said different directions.

6. The method of claim 1, wherein detecting location information further includes determining the direction of a transmitting station relative to the receiving station, as location information.

7. The method of claim 2, further comprising: the coordinator station maintaining location information for associated stations in the network relative to the coordinator station; the coordinator station periodically transmitting said location information in a beacon; and an associated receiving station using a reduced PHY preamble and reduced payload in a frame transmission to the coordinator station based on the corresponding location information.

8. A system for device discovery in a wireless network, comprising:

a coordinator station configured for transmitting N copies of a beacon in N different directions to a receiving station, wherein the coordinator station determines quality of transmissions received from different directions, and detects location information for a transmitting station relative to the receiving station which receives transmissions from the transmitting station, based on a highest quality transmission among the transmissions received from the different directions, wherein the location information comprises a location vector including N elements corresponding to directional transmissions of a data unit in N different directions, wherein each vector element describes the signal quality of the transmission along a corresponding one of the N directions; and a management entity of the receiving station that measures and compares signal quality for copies of the beacon received in different directions, and determines a new location vector, wherein the receiving station determines a distance between the new location vector and an existing location vector.

9. The system of claim 8, further comprising:
a communication module that directionally transmits a data unit from the transmitting station over a channel in different directions to emulate omni-directional transmission, wherein the management entity receives the data unit transmissions from different directions at the receiving station.

10. The system of claim 9, wherein the coordinator station periodically transmits a beacon in omni-directional emulation mode.

11. The system of claim 10, wherein the management entity detects location information by determining the direction of the transmitting station relative to the receiving station, as location information.

12. The system of claim 10 wherein the data unit comprises a frame.

13. The system of claim 11 wherein: the receiving station is configured such that, if the difference between new location information and the previous measured location information is larger than a pre-defined threshold, then the receiving station transmits a location updating control frame to the coordinator station; and the coordinator station is further configured to updating the location information for the receiving station maintained by the coordinator station.

14. A method for device discovery in a wireless network, comprising:
receiving data unit transmissions from different directions transmitted by a transmitting station at a receiving station;
determining quality of the transmissions received from the different directions by the receiving station;
detecting location information based on a highest quality transmission among the transmissions received from the different directions, wherein the location information comprises a location vector including N elements corresponding to directional retransmissions of a data unit in N different directions, wherein each vector element describes the signal quality of received directional retransmission along a corresponding one of the N direction; and
measuring and comparing, by the receiving station, the signal quality for copies of a beacon received in different directions, to determine a new location vector, wherein the receiving station determines a distance between the new location vector and an existing location vector.

15. The method of claim 14, further comprising:
directionally transmitting a data unit from a transmitting station over a channel in different directions to emulate omni-directional transmission.

16. The method of claim 15, wherein detecting location information comprises detecting the location information for the transmitting station relative to the receiving station.

17. The method of claim 16, further comprising:
a coordinator station transmitting the beacon, wherein N copies of the beacon are directionally transmitted in N different directions.

18. The method of claim 17, wherein the coordinator station comprises a sink of one of video data, audio data, and video and audio data.

19. The method of claim 17, wherein the coordinator station provides channel coordination functions for wireless communication between a sink station and a source station.

20. The method of claim 17, wherein the coordinator station uses a high rate channel and a low rate channel for communicating video information with the receiving station and transmitting station, wherein the high rate channel only supports single direction unicast transmission for support of uncompressed high definition (HD) video data, and the low rate channel supports bi-directional transmission.

21. A method for device discovery in a wireless network, comprising:
directionally transmitting a data unit from a transmitting station over a channel in different directions to emulate omni-directional transmission;
determining quality of the transmissions transmitted in the different directions by a receiving station;
detecting location information based on a highest quality transmission among the transmissions transmitted in the different directions by the receiving station, wherein the location information comprises a location vector including N elements corresponding to directional retransmissions of a data unit in N different directions, wherein each vector element describes the signal quality of transmitted directional retransmission along a corresponding one of the N directions; and
measuring and comparing, by the receiving station, the signal quality for copies of a beacon received in different directions, to determine a new location vector, wherein the receiving station determines a distance between the new location vector and an existing location vector.

22. A method for device discovery in a wireless network, comprising:
directionally transmitting a data unit from a transmitting station over a channel in different directions to emulate omni-directional transmission to a receiving station;
detecting location information, by the receiving station, based on a highest quality transmission among the transmissions transmitted in the different directions, wherein the location information comprises a location vector including N elements corresponding to directional transmissions of a data unit in N different directions, wherein each vector element describes the signal quality of the transmission along a corresponding one of the N directions; and
measuring and comparing, by the receiving station, the signal quality for copies of a beacon received in different directions, to determine a new location vector, wherein the receiving station determines a distance between the new location vector and an existing location vector.

* * * * *